April 7, 1970 P. A. SCHERER 3,504,649
HYDROFOIL PROPULSION AND CONTROL METHODS AND APPARATUS
Filed Oct. 16, 1967 2 Sheets-Sheet 1

INVENTOR
PAUL A. SCHERER

BY *Littlepage, Quaintance & Wray*

ATTORNEYS

April 7, 1970  P. A. SCHERER  3,504,649
HYDROFOIL PROPULSION AND CONTROL METHODS AND APPARATUS
Filed Oct. 16, 1967  2 Sheets-Sheet 2
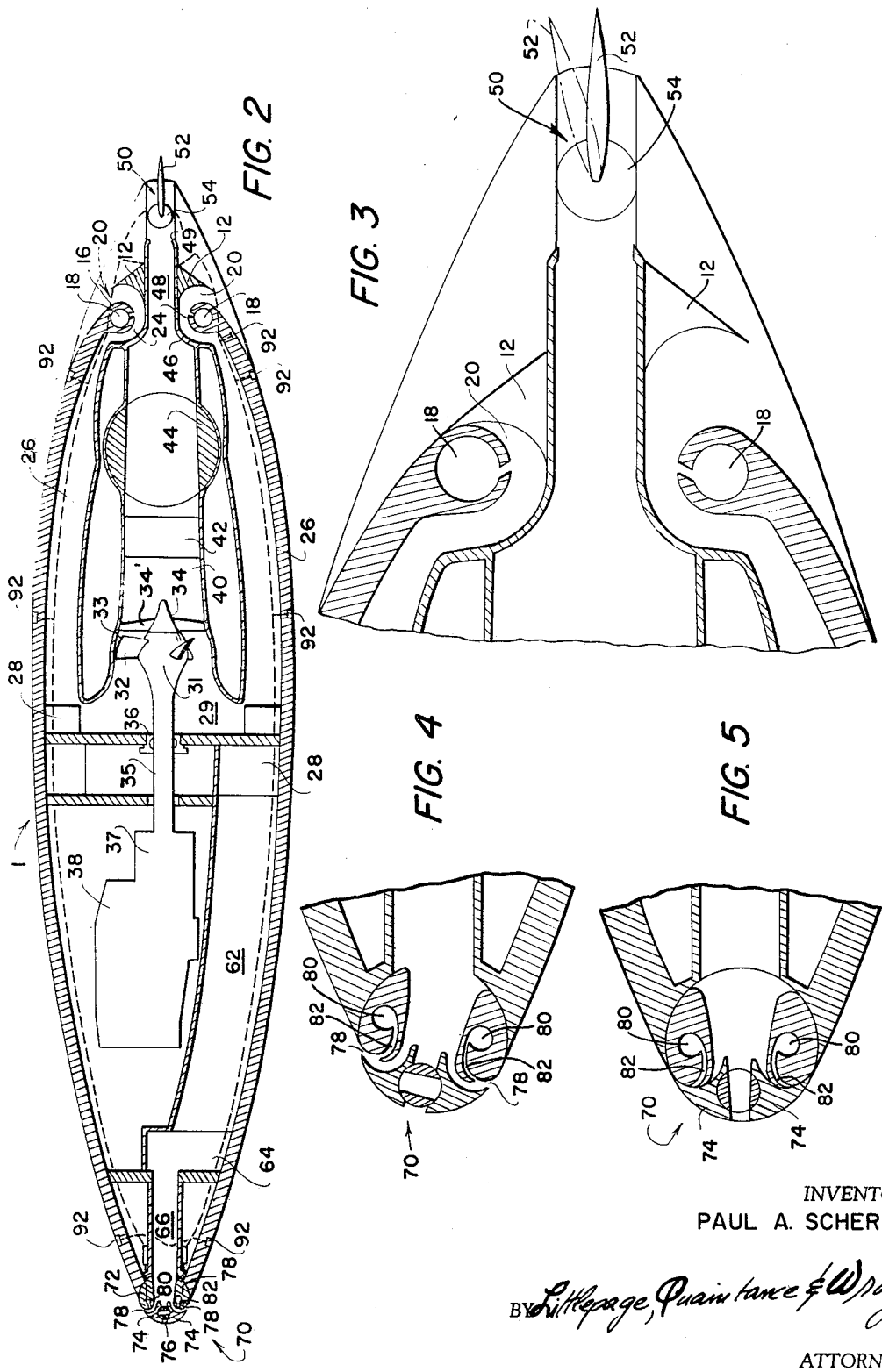
INVENTOR
PAUL A. SCHERER
BY Littlepage, Quaintance & Wray
ATTORNEYS United States Patent Office 3,504,649
Patented Apr. 7, 1970

3,504,649
HYDROFOIL PROPULSION AND CONTROL
METHODS AND APPARATUS
Paul A. Scherer, Bell Station Road,
Glenn Dale, Md. 20769
Filed Oct. 16, 1967, Ser. No. 675,379
Int. Cl. B63b 1/18
U.S. Cl. 114—66.5                    22 Claims

ABSTRACT OF THE DISCLOSURE

Hydrofoils having prime movers, pumps intakes near trailing edges, exhaust ports in trailing edges and near leading edges, air ports near leading and trailing edges, adjustable blocking devices associated with the ports, pressure sensors in surfaces of the hydrofoils and relays controlling the blocking devices in response to signals from the sensors are described herein.

HISTORY

Hydrofoils have been used in many light, high speed water craft. Hydrofoils may be employed in the future in large ocean going ships, including cargo vessels, tankers and passenger liners, and naval ships. The use of hydrofoils with craft of heavy tonnage creates problems of magnitudes heretofore unexperienced in hydrofoil craft. Well known multiple hydrofoil assemblies which are workable with runabouts would require cumbersome multiplication for use with large craft. While small craft having dihedral hydrofoils may rely upon increased foil submergence for increased lift, such a process would be difficult to use with large craft. Foil pivoting becomes less significant for control and more difficult to achieve as foils become larger.

One great problem is the achieving of transitory conditions necessary to lift large craft from a hull carried position to a fully foil borne attitude. Lifting the great mass of a merchant ship requires many foot pounds of work. Required starting power is a multiple of operating power requirements. Complex solutions have been sought. One has been found in the use of displacement foils discussed in copending application 396,806, filed Sept. 10, 1964, now Patent 3,347,197, issued Oct. 17, 1967, and entitled Foil Systems.

Because large masses of ships and foils create huge acceleration forces, relative movements between pivoted foils and ships to vary angles of attack require gigantic strong equipment. Fixed hydrofoils would obviate problems caused by relative motion between hydrofoils and support structure, but with fixed foil systems, craft must move excessively to effect a minute change in foil angle of attack. Correcting motions of the ships have undesirable effects upon cargo, passengers and structures. Momentum of large craft causes over-control and requires damping which fixed foil systems in themselves cannot provide.

SUMMARY OF INVENTION

This invention solves inherent problems of supporting large ships upon hydrofoils, by employing fixed foils and by controlling the apparent angles of attack of those foils through selectively varying the flow over upper and lower surfaces of the foils.

Foils of the present invention withdraw fluid from streams flowing over the foil through upper and lower ports adjacent the trailing edges of the foils, and jet fluid aft from ports adjacent the leading edges, affecting dynamic fluid sheets which circulate over the foil surfaces. As fluid moves over a surface, pressure normal to the surface is reduced. Pressure on the total surface area creates a force perpendicular to the direction of travel, which force is the lift produced by fluid flow over a surface. Opposite surfaces produce opposite lift, and the resultant or difference between the two lifts of opposite faces of one foil is the lift produced by the foil. In the present case, negative or downward lift is achieved by increasing the flow over a lower surface with respect to the flow over an upper surface of a foil.

Lift produced by hydrofoils of the present invention is controlled by varying circulation over opposite surfaces of the foil. Operating devices to restrict or block intakes or forward exhaust ports or to block lubricating air outlets in the upper surface of a hydrofoil reduces the relative velocity of the hydrofoil and water moving across the upper surface. Relative velocity of water on the lower surface of the foil remains constant. The change in velocities and the inherent increase in pressure due to reduced relative velocity of the upper surface of the hydrofoil causes a downward or negative increment of lift. Restricting or closing ports or passages in the lower surface creates an upward or positive lift increment.

To change the lift of a foil it is necessary to alter the circulation about the foil, and that is done through the forming and shedding of starting vortices from the trailing edge of the foil. Since every action causes equal and opposite reaction, the starting vortices induce opposite circulation around the foil. If all components of motion of the craft with lifting foils were removed from the flow pattern, the resultant flow would be one of simple rotation with the flow moving from leading edge to trailing edge over the top of the foil.

This invention employs pressure sensing devices on the surface of foils to detect pressure changes which indicate that starting vortices are being formed. Servo systems are connected to the pressure sensing devices and to intake restricting or jet deflecting apparatus. The servo systems effect flow controlling response, which cancel the building up of starting vortices. The sensing devices and servo systems prevent substantial changes from the established flow pattern and consequently keep the lift of a foil substantially constant until a desired change is commanded.

The changing of circulation about a foil or the building up and shedding of a starting vortex or a sheet of vortices occurs only when the velocity is greater on one surface than on the other surface of a foil. Since velocity is related to static pressure, pressure taps on opposite surfaces might be interconnected to yield sign and quantity of pressure differences, which indicate changing of velocity ratios.

The difference in pressure in an open tube would produce a flow having a velocity and direction related to the pressure difference. That flow can be amplified if necessary using convention fluid amplifiers. Its product may be exhausted from one of two spanwise slits or openings at the top and bottom of the rectangular jet discharge port, facilitating upward or downward deflection of the jet to correct for pressure changes on the surfaces. The same or a separate set of jet deflecting slits may be used to enter command turning signals. Pulsed jet deflecting streams are preferable. If one unwanted starting vortex is shed, a single pulse through the jet deflecting slits deflects the jet sufficiently to shed a correcting starting vortex from the opposite foil surface.

So that operating efficiency may be increased, foil surface frictional losses are decreased by introducing air to the stream as it leaves the leading edge. Being lighter than water, the air is confined in a low pressure area adjacent the foil surface, where the air forms a low shear-strength fluid film covering the foil surface and lubricating the foil-water interface. As long as laminar flow is maintained, the air reduces frictional losses by a factor related to the relative masses of water and air. To prevent the air from moving away from the surface of the foil, the intake means includes an air extractor to withdraw the air from the stream at an appropriate location while the water is being angularly accelerated.

Water is withdrawn from upper and lower foil surfaces near the trailing edge at a pressure low enough to produce a negative pressure gradient over the entire foil surface. Water enters expanding channels within the foil, reducing internal water velocity to lower frictional losses in the duct system. Diameters of the pumps are sufficiently large so that water velocities over the blades will be below cavitation velocities. Pumps discharge into relatively large plenum channels to keep internal duct losses at a minimum. Dimensions of the trailing edge jets are appropriate to give efficient thrust at design speeds and to promote laminar flow over the surface of the foil near the trailing edge. The propulsive jet may be deflected mechanically or hydraulically to produce lift and to change flow patterns over the foil.

In one embodiment an external flap which pivots substantially around its leading edge is centered horizontally in the jet to provide further lift control.

A single hydrofoil propulsion and control system may be made up of several complete and independent units. Two primary purposes suggest this design. In order that the foil may respond in sections to sea patterns moving laterally across the foil, each unit operates separately to follow the sea pattern by "wrapping" the foil, that is, by controlling the flow to maintain flow constant over adjacent sections. Modular design permits construction of foils of varied span and provides compartmentation and structural integrity for safety from fire, collision or other damage.

One objective of this invention is the provision of fixed hydrofoils apparatus. Another objective of this invention is the provision of lift control methods for fixed foils.

This invention has as a further objective the provision of pressure sensors on foil surfaces for detecting the building up and shedding of starting vortices.

A further objective of this invention is the provision of an improved fluid lubrication system for hydrofoils.

This invention has as another objective the provision of apparatus for providing propulsion and lift control for foil supported craft.

Other objectives of this invention will be apparent from the specification and from the drawings.

BRIEF DESCRIPTION OF DRAWINGS

FIGURE 2 is a sectional view of a foil illustrating one complete operational unit comprising an engine, reduction gearing, a pump and intakes and discharge means;

FIGURE 3 is a sectional detail of intake apparatus;

FIGURES 4 and 5 are sectional details of forward exhaust ports in varied operational positions.

DETAILED DESCRIPTION OF DRAWINGS

Figure 1:
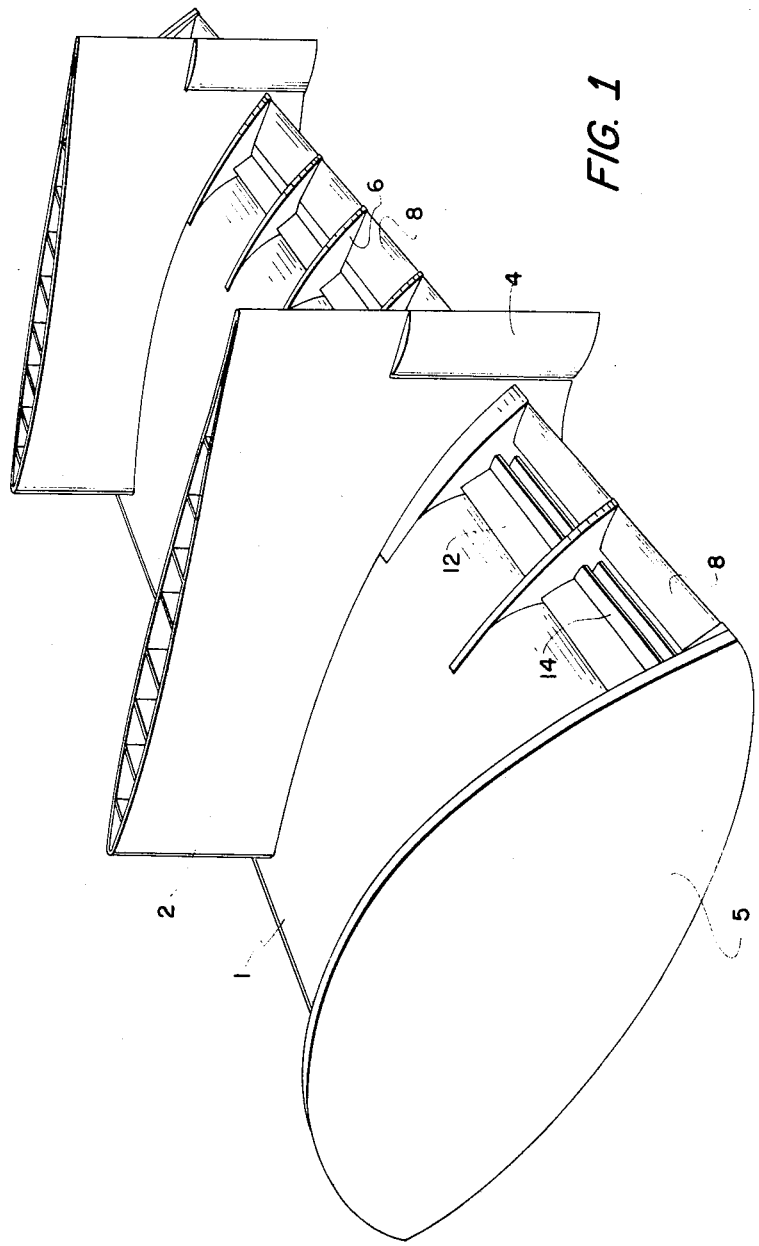
FIGURE 1 is a perspective view of a hydrofoil having propulsion and control apparatus of this invention.

The apparatus shown in FIGURE 1 has a displacement hydrofoil 1 and struts 2 for rigidly mounting the foil on a body of a ship which is not shown. The lower after portions of the struts 2 are recessed to receive rudders 4, which are symmetrical flaps. In this embodiment, vertical end plates 5 are mounted at the lateral extremities of hydrofoil 1. Vertical dividers 6 near the trailing edge of foil 1 separate the after surface of the foil according to the interior division of the foil into nacelle-type units. In the embodiment which is shown in FIGURE 1 there are eight propulsion and control units, four inboard of the struts, and four outboard. Dividers 6 serve as supporting members for external flaps 8, for sliding intake blocks 12 and for jet entrainers 14.

As shown in FIGURE 2, intake 20 in foil 1 is defined between a rounded end portion 16 of the foil surface and a sliding wedge 12 which controls the width of intake port 20. An end entrainer or gas withdrawing means 18 removes air and gas from the low pressure area of intake ducts 24. Flow is uniformly reduced in speed as the intakes are increased in volume from ducts 24 to ducts 26. Fluid is drawn from ducts 26 into chamber 29 by pump 30. Thwartship channels 28 may be opened to pass fluid laterally among individual propulsion and control units to equalize intake and exhaust pressures or to operate with less than the total number of pumps.

The pump comprises a spherical hub 31 upon which blades 32 are mounted. Spherical housing 33 allows the blades to fit tightly against the inner wall of the housing while rotating. Blades 32 may be turned upon axes radiating from spherical hub 31 to vary the amount of fluid moved through the intakes and jets. Acting as a fixed bearing, pump hub 34 is supported by canted blades 34', which remove rotational components from fluid as it is driven from pump blades 32. Pump shaft 35 passes through a watertight seal 36 into the engine compartment. Shaft 35 is rotated by a belt drive unit or by reduction gearing 37, which is directly coupled to engine 38.

Pump 30 jets water into chamber 40, which changes from cylindrical to square cross section between pump 30 and thwartship channel 42. The main output of the pump continues to flow through main shut off valve 44 as flow chamber takes rectangular form. A reduction in the height of the chamber at 46 increases velocity head, before water passes through rectangular throat 48 and out jet orifice 49.

In the FIGURE 3 detail, upper blocking member 12 has been slid forward to close upper intake 20, creating a negative increment of lift. Flap 52 may be pivoted as shown in broken lines to deflect the jet stream upward, creating a negative lift increment. Intake blocking members 12 and flap 52 may be moved individually or collectively to effect lift changes, and either member may be moved in extremely small increments.

Jetted fluid passes over external flap control 50, which includes a foil 52 fixed at opposite ends to discs 54, which rotate in dividers 6. Opposite ends of the leading edge of foil 52 are centered in discs 54, and the leading edge of foil 52 is centered in the jet stream.

A forward distribution means 70 is fed by pump 30 through thwartship channel 42 and passages 62, 64 and 66. Channel 62 obtains water from channel 42 through conduits now shown in the sectional view and conducts water forward beneath engine 38 to thwartship distribution channel 64. Flow is spread across the foil section in header 66 as it is delivered to forward jet apparatus 70.

Head 70 comprises parallel portions 72 which are movable in a recess in the forward portion of foil 1. Elements 74 are relatively fixed in head 70 but they may be moved fore and aft with respect to elements 72 in order to change the openings of ports 78 as shown in FIGURE 5. Cylindrical reversing valve 76 rotates within elements 74 to direct a fluid stream ahead for reversing propulsion. The entire head 70 rotates within a recess in the forward section of the foil to selectively vary dimensions of upper and lower jet openings 78. Gas injecting pipes 80 and channels 82 release a coating of air in the forward jet ports 78 so that sheets of fluid exhausted rearward from those ports retain air in a low pressure area adjacent the foil surface.

Rotating head 70 in a clockwise direction restricts and finally closes upper port 78, as shown in FIGURE 4. Since lower jet 78 remains unaffected, flow is reduced over the top of the foil while flow over the lower surface remains unchanged. The result is an unbalance of the dynamic lift of the foil so that a negative lift is effected.

Pressure sensors 92 pick up changes in pressure which indicate the building up of starting vortices. Sensors 92 then transmit signals to relays which control actuators for moving the appropriate control surfaces such as blocks 12, head 70 or external flap 50 to prevent the shedding of a starting vortex.

Struts 2 may have jet steering systems which are supplied by channels 42. Exhaust port may be located directly ahead of symmetrical rudders 4, so that the ports jet water over foil shaped rudder 4 to increase its effectiveness.

Although this invention has been described in part by specific example, many modifications and other uses of the invention will be apparent to those skilled in the art. Therefore, this invention is not limited to the specific embodiments described herein. The scope of the invention is defined only in the appended claims.

I claim:

1. Propulsion apparatus for craft including at least one foil having leading and trailing edges; the apparatus comprising:
   prime mover means fixed with respect to the craft;
   fluid propelling means operatively connected to the prime mover means;
   port means communicant with the fluid propelling means and with surfaces of the foil, the port means comprising upper and lower intake means adjacent the trailing edge of the at least one foil, and discharge means in the surface of the foil; and
   blocking means adjustably controlling size of at least one port means.

2. Apparatus of claim 1 wherein the discharge means comprises upper and lower jet port means adjacent the leading edge.

3. Apparatus of claim 2 further comprising gas injecting means connected to the upper and lower jet port means for injecting gas along fluid flowing through the jet port means, and further comprising gas withdrawing means mounted in the intake means for withdrawing gas from fluid flowing through the intake means.

4. Apparatus of claim 2 wherein the upper and lower jet port means have adjustable blocking means, and wherein the upper and lower intake means have adjustable blocking means.

5. The apparatus of claim 1 wherein at least a portion of the leading edge of the at least one foil comprises a cylinder defining spaced upper and lower jet ports and being limitedly rotatably mounted in the foils, whereby controlled rotation of the cylinder cooperates with adjacent fixed portions of the foil, thereby selectively varying openings of the upper and lower jet ports.

6. The apparatus of claim 1 wherein said discharge means comprises elongated jet port means in the trailing edge of the foil.

7. Apparatus of claim 6 further comprising at least one foil-shaped rotatable external flap connected to the foil and pivoted aft of the second jet port means.

8. The apparatus of claim 6 wherein the discharge means comprises forward-opening reversing jet means, and wherein the apparatus further comprises means to disconnect the reversing jet means from the propelling means and means to disconnect the elongated jet port means from the propelling means.

9. Apparatus of claim 1 wherein the intake means comprises convex after portions of the foil, and wedges having complementary concave faces and being reciprocable fore and aft, thereby varying openings of the intake means.

10. Apparatus of claim 1 further comprising multiple fluid propelling means, multiple intake means and multiple discharge means, and channel means and valve means selectively interconnecting adjacent propelling means, intake means and discharge means.

11. Apparatus of claim 1 further comprising strut means interconnecting a body of the craft and the at least one foil, and external flap rudders pivoted aft of the strut means, and further comprising elongated ports in trailing edges of the strut means, whereby steering is enhanced by discharging fluid jets over the external flap rudders.

12. Propulsion apparatus for craft having at least one foil of claim 1 further comprising:
   pressure sensing means mounted on opposite surfaces of the foil, and
   controlling means responsive to the pressure sensing means controlling the blocking means in response to change in pressure on surfaces of the foil.

13. The method of propelling foil supporting craft comprising:
   drawing fluid into a foil in intake ports adjacent a trailing edge of the foil,
   imparting energy to the fluid,
   jetting fluid aft along an exterior surface of the foil from discharge ports in a surface of the foil adjacent the leading edge thereof,
   jetting fluid aft from the trailing edge, and
   selectively adjusting at least one of the intake and discharge ports.

14. The method of propelling a craft which is a foil having its depth less than its chord and being supported in an ambient fluid, comprising:
   drawing ambient fluid into a foil in upper and lower elongated intake ports extending a full span length adjacent a trailing edge of the foil,
   imparting energy to the ambient fluid,
   jetting ambient fluid from upper and lower elongated discharge ports extending a full span length adjacent a leading edge of the foil, and
   selectively adjusting at least one of the intake and discharge ports.

15. The method of claim 14, further comprising injecting gas into the ambient fluid when jetting the fluid and withdrawing gas from the ambient fluid when drawing the ambient fluid into the foil.

16. The method of claim 14 wherein the foil is a hydrofoil and the withdrawing and jetting of ambient fluid comprises wtihdrawing and jetting water.

17. The method of claim 14 further comprising:
   sensing pressures on upper and lower surfaces of the hydrofoil, and signalling when pressure changes at a point on a surface of the hydrofoil,
   operating propulsive fluid control means in response to a signal of pressure change on a surface of the foil, thereby tending to prevent building up and shedding of a starting vortex.

18. The method of claim 17 wherein the operating step comprises changing and opening of a propulsive fluid exhaust jet port adjacent a leading edge of the foil.

19. The method of claim 17 wherein the operating step comprises changing a size of a propulsive fluid intake adjacent a trailing edge of the hydrofoil.

20. The method of claim 17 wherein the operating step comprises deflecting a main propulsive fluid discharge jet from the trailing edge of the foil.

21. The method of claim 20 wherein the deflecting step comprises jetting propulsive fluid at an angle into a main propulsive fluid jet adjacent a trailing edge of the foil.

22. The method of claim 20 wherein the deflecting step comprises changing angle of attack of a flap connected to a trailing edge of the hydrofoil and positioned in a main propulsive jet.

References Cited

UNITED STATES PATENTS

| | | | |
|---|---|---|---|
| 3,012,740 | 12/1961 | Wagner. | |
| 1,763,590 | 6/1930 | Klemperer | 244—78 |
| 3,205,846 | 9/1965 | Lang | 114—67 |
| 3,209,714 | 10/1965 | Bowles | 114—66.5 |
| 3,303,810 | 2/1967 | Giles | 114—67 |
| 3,335,687 | 8/1967 | Von Schertel | 114—66.5 |

A. H. FARRELL, Primary Examiner